May 15, 1934.   J. H. PERKINS   1,958,765
CONTAINER FOR FOOD AND OTHER PRODUCTS
Filed Oct. 5, 1932
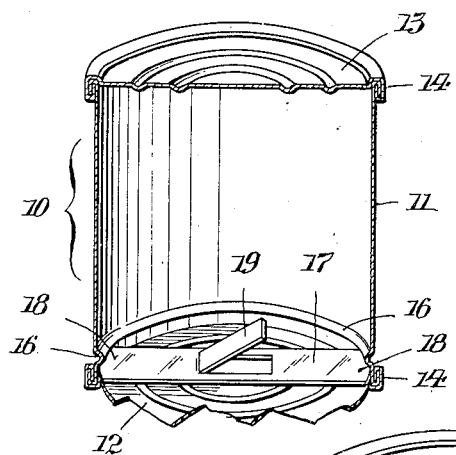
FIG. I.
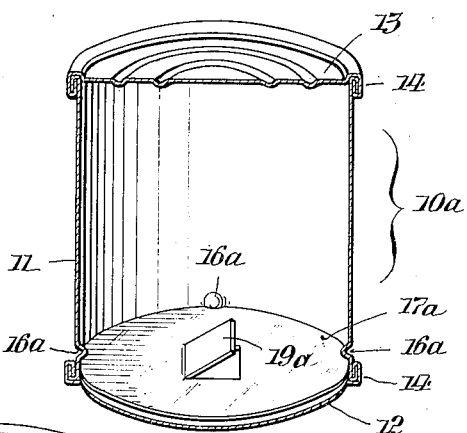
FIG. II.
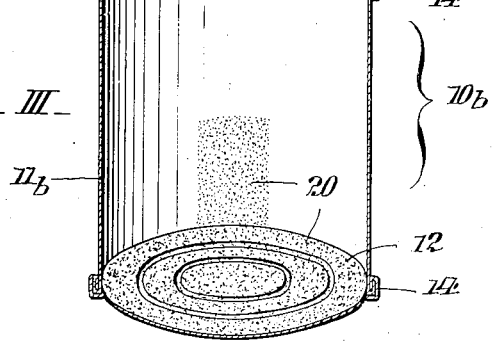
FIG. III.
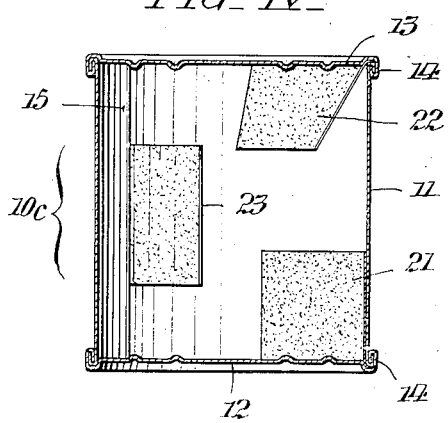
FIG. IV.
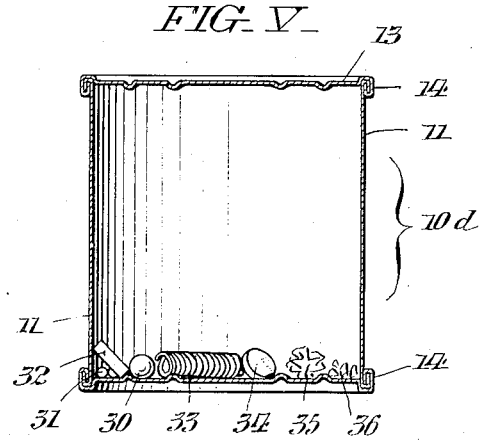
FIG. V.
WITNESSES:
Hubert Fuchs
William Bell, Jr.
INVENTOR:
Joseph H. Perkins,
BY Fally Paul
ATTORNEYS Patented May 15, 1934

1,958,765

UNITED STATES PATENT OFFICE 1,958,765

CONTAINER FOR FOOD AND OTHER PRODUCTS

Joseph H. Perkins, Swarthmore, Pa.

Application October 5, 1932, Serial No. 636,264

7 Claims. (Cl. 99—8)

This invention relates to containers for food and other products or substances, and involves a novel method as well as novelty in the container structure. A principal object of the invention is to prevent or retard corrosion of metal containers by their contents, and consequent deterioration of the latter, as respects odors, flavor, appearance, etc., as well as failure to preserve the contents against natural decay or deterioration. Such corrosion sometimes affects seriously the iron metal containers or cans now so widely used, including those of tinned sheet iron or "tin plate". Its effects may involve etching of the tin, detinning, rusting of the iron, and even perforation of the cans.

Various means of protecting portable or shipping containers of iron metal (sheet iron or steel) for foods and other products for human (or animal) consumption have heretofore been proposed or tried, including protective coatings or linings for the sheet metal, as of tin, varnish or lacquer, aluminum, and even silver, intended to shield the iron from contact with the contents. It has also been proposed to provide tin cans with an internal absorbent of deleterious gas existing or formed therein, such as iron or steel, magnesium, or aluminum, so located as to be normally exposed to gas above the can's contents, and out of contact with such contents.

Coatings of tin (i. e., cans of ordinary tin plate) have often proved unsuccessful for several reasons: first, because the tin itself is eaten by acid fruit or food juices; secondly, because the coating of tin is never impervious, but on the contrary, has many fine holes, through which the acids reach and corrode the iron, which then protects the tin electrolytically, instead of being itself shielded by the tin from contact with corrosive. Linings or coatings of aluminum and silver are unduly expensive; and varnish or lacquer has likewise proved unsatisfactory.

The suggestion of iron, magnesium, or aluminum as gas absorbents rests upon a misconception, because these metals could not "absorb" the gases supposed to exist and to exert a deleterious influence in the can, such as oxygen or hydrogen sulphide.

I have discovered that portable or shipping containers of iron metal (including those of tin plate) can be very simply and inexpensively protected against corrosion by food juices or acids, such as those of vegetables, fruits, nuts, roots, or meats, etc., or by other contents for human or animal consumption including or affording an electrolyte, or even by substances added as preservatives. For this purpose, I expose in the canned product a surface of aluminum metal (or a suitable alloy of aluminum), which is also in electrical connection or contact with the metal (tinned or untinned) of the container itself. Both the aluminum and the metal of the container being in contact with the canned product, the aluminum acts to protect the metal of the container electrolytically, becoming the anode of a galvanic couple of which the iron and/or tin of the container is cathode, while the corrosive principle or ingredient of the contents of the container is the electrolyte. Being electropositive to tin as well as to iron, the aluminum prevents (or greatly retards) etching or eating off of the tin, as well as corrosion of the iron metal: i. e., when electrolysis is set up, the aluminum is acted on and tends to dissolve while the iron and tin remain unaffected. As the aluminum is practically non-poisonous and (as well as most of its salts) light in color, the small amount of it dissolved in the contents of the container is unobjectionable.

The aluminum used for the purposes of my invention need not be chemically pure: on the contrary, ordinary commercial aluminum is quite satisfactory, and even less pure forms of aluminum can generally be used. Alloys containing aluminum which are electropositive to iron (and tin) can also be used, at least when all their components are substantially non-toxic. Without attempting an exhaustive catalogue of suitable known alloys, the following illustrations may be cited, the percentages given being computed in terms of the total of aluminum and other components:

Aluminum 98–70% and magnesium 2–30%.
Aluminum 98½% and manganese 1½%.
Aluminum 91% and zinc 9%.
Aluminum 95% and silicon 5%.

In general, I have used the term "aluminum metal" as including suitable aluminum alloys, as well as aluminum itself, except, of course, where the context indicates a different meaning. Likewise, I have generally used the term "iron metal" as including tin-plate, as well as the various forms of iron (such as wrought iron or mild steel) of which tin-plate or other containers may be made.

Unlike the use of tin, aluminum, or varnish, etc., as a coating or lining to keep the contents from coming in contact with the metal of the container, the use of aluminum metal for electrolytic protection of the container does not require the exposed inner surface of the container to be entirely of aluminum. On the contrary, protective electrolytic action can only occur when the metal of the container is more or less exposed to the electrolyte afforded by the contents, as well as the aluminum. Nor can aluminum afford electrolytic protection when itself located above the contents of the container, as proposed for the purpose of absorbing deleterious gases, as already explained. Nor, again, can aluminum afford electrolytic protection when not itself in electrical contact or connection with the metal of the container: e. g., when aluminum powder is used in varnish or lacquer to coat the interior of the can, the aluminum particles are insulated from the can by the varnish, as well as from the electrolyte.

However, a coating of varnish, lacquer, paraffine, or the like on the interior of a can or other metal container is not inconsistent with the use of aluminum metal for electrolytic protection of the can: i. e., aluminum metal may be used in such a container as a secondary measure of protection, in case there should be a flaw in its varnish coating, or in case this coating should be accidentally injured or removed over a greater or less area, or should even be inadvertently omitted altogether.

Subject to the necessity of electrical connection between the aluminum metal and the metal of the container, and contact of both with its contents, aluminum (or aluminum alloy) can be used for the purposes of my invention in a variety of ways, as well as in a multitude of forms—such as ball, pellet, rod or bar, wire, sheet or disc, foil, flakes or powder, etc. The aluminum metal may form part of the exposed surface of the container wall, as, for example, a coating plated, sprayed, or otherwise applied thereto; or it may be otherwise fastened to the container or its wall, so as to lie thereagainst or project inward therefrom; or, especially in the case of cans intended for mainly liquid products, it may be introduced loose or free or added to the contents, so as always to gravitate into electrical contact with the container wall, in whatever position the container may stand or lie. Or, again, a plurality of such arrangements may be employed in a given container.

In the drawing, Fig. I shows a tilted or perspective and vertical sectional view of a metal can, illustrating one form of embodiment of my invention wherein a piece of sheet aluminum is so arranged in the can as to be always in contact with its contents.

Fig. II is a similar view, showing a modified construction.

Fig. III is a similar view showing an internal coating of aluminum sprayed on the can bottom and part of its side.

Fig. IV is a similar view showing pieces of sheet aluminum included in the joints of a tin can and extending inward therein.

Fig. V is a similar view showing fragments of aluminum loose in a can.

Fig. I shows a metal can 10 of ordinary general form, consisting of a cylindrical body 11 with flat heads or ends 12, 13 secured thereto by the usual crimped and/or soldered joints 14, 14, and 15, or by any suitable type or form of joints. All these parts 11, 12, 15 are preferably of iron metal (iron or tin plate). Near the bottom 12, an internal projection or ridge 16 appears in the cylindrical wall 11 at each side, preferably formed by an annular inward embossed rib extending all around the can. A flat member 17 in the form of a diametral strip of sheet aluminum extends across the bottom 12, with its ends 18, 18 engaged beneath or behind the projections 16, 16 to keep it in place. The mid-portion of the strip 17 may preferably have a tongue 19 projecting inward and upward, formed by punching a portion of the metal free except at the tongue root and bending the punched out portion inward.

In practice, the annular ridge or rib 16 may preferably be formed in the can wall 11 as an incident of the manufacture of the can. The strip 17 may if desired be inserted in position before the bottom 12 is applied and secured; but it is generally preferred to insert it after the can is thus bottomed, at any time before filling the can and/or applying the top 13. This may easily be done by inserting the strip 17, engaging one end 18 under one ridge 16 and the other end 18 against the can side above the other ridge 16, and then forcing this latter end 18 down past the ridge 16. In this operation, the strip 17 becomes resiliently flexed (up or down) and straightens itself again, thus locking itself securely in position. The tongue 19, preformed by suitable punching of the strip 17, can easily be bent up as or after the strip 17 is installed in the can.

Fig. II shows a variant in which the member 17a has the form of a circular disc just big enough to enter the can 10a, and is held by a suitable number (e. g., 2, 3, 4) of isolated internal knob projections 16a on the can wall 11 near its bottom 12. If preferred, these knobs 16a may be formed after placing the disc 17a in the can. Various parts and features in Fig. II are marked with the same reference characters as in Fig. I, to dispense with repetitive description.

It will readily be understood that however the can 10 or 10a may be turned, its contents will touch the tongue 19 or 19a as well as the tin plate or iron of the body 5. The aluminum at 17, 19 is always in electrical connection with the iron (and tin, if any).

Fig. III shows a can 10b similar to the can 10, though without its internal projection features 16 or member 17. Instead, it has an area 20 spray-coated with aluminum, and including part of its side or body wall 11b as well as its end 12, so as to be always in contact with the contents of the can.

Fig. IV shows a can 10c similar in general construction to the can 10 of Fig. I, but provided with two pieces of sheet aluminum 21, 22 crimped and/or soldered into its end joints 14, so as to extend inward in the interior of the can, and with another piece 23 similarly crimped and/or soldered into its longitudinal body joint 15 so as to extend inward, toward, across, or adjacent the center of the can. As here shown, the piece 21 associated with the can end 12 extends lengthwise and upward flat against the body wall 11, conforming to its curvature; while the piece 22 associated with the end 13 projects diagonally inward and downward, and is curved to a less degree. The piece 23 is flat and radial. All three pieces 21, 22, 23 are shown of sufficient extent to touch the contents in any and every position of the can 10c. If any one or two of the aluminum pieces 21, 22, 23 be made sufficiently large, the rest of such pieces may obviously be dispensed with.

Fig. V shows a can 10d similar in general construction to the can 10, but containing a number of loose aluminum pieces, such as ball 30, pellet 31, bar 32, wire helix 33, disc 34, crumpled foil 35, flakes 36, etc., etc. Obviously, these will always gravitate into contact with the container wall that happens to be lowermost, and will likewise always be in contact with the contents.

In Figs. II, III, IV, and V, various parts and features are marked with the same reference characters as in Fig. I, as a means of dispensing with repetitive description. It is also to be understood that in referring to "soldered" joints, I not only recognize the necessity of using special solder or the like for aluminum, but intend the expression "soldered" in a generic sense, as including all welded or other joints produced by fusion or incipient fusion of one or both the parts united or of a connective substance whereby an electrically conductive joint is preferably formed.

Having thus described my invention, I claim:

1. The combination, with an iron metal portable or shipping container for food or other contents for human or animal consumption which afford a corrosive electrolyte, of aluminum metal in the container in electrical connection with the metal thereof and in contact with the container contents, regardless of the position in which the container may stand or lie.

2. A combination substantially as set forth in the preceding claim wherein the container is specifically of tin plate.

3. The combination, with an iron metal portable or shipping container for food or other contents for human or animal consumption which afford a corrosive electrolyte, of a piece of aluminum metal loose in the container, so as to gravitate into contact with its wall in any position of the container.

4. A combination as set forth in claim 1 wherein the aluminum metal is secured in a joint of the container, and is thus maintained in such position inside it as always to be in contact with the container contents.

5. A combination as set forth in claim 1 wherein an end of the can and a portion of its side have internal surfaces of aluminum metal so that such metal is in contact with the container contents in any position to which it may be turned.

6. An iron metal portable or shipping container, for food or other contents which afford a corrosive electrolyte, having inward projections on its opposite wall adjacent one of its ends, in combination with a piece of aluminum metal extending across the interior of the container with its edges engaged behind said projections.

7. An iron metal portable or shipping container, for food or other contents which afford a corrosive electrolyte, having inward projections on its opposite wall adjacent one of its ends, in combination with a piece of sheet aluminum metal extending across the interior of the container with its edges engaged behind said projections, said sheet having a punched out in-bent tongue portion projecting inward into the interior of the container, so as always to be in contact with the container contents.

JOSEPH H. PERKINS.